United States Patent [19]
Nicollini et al.

[11] Patent Number: 5,559,687
[45] Date of Patent: Sep. 24, 1996

[54] VOLTAGE MULTIPLIER FOR HIGH OUTPUT CURRENT WITH STABILIZED OUTPUT VOLTAGE

[75] Inventors: Germano Nicollini, Piacenza; Pierangelo Confalonieri, Canonica D'Adda; Carlo Crippa, Merate, all of Italy

[73] Assignee: SGS-Thomson Microelectronics, S.r.l., Agrate Brianza, Italy

[21] Appl. No.: 261,473

[22] Filed: Jun. 17, 1994

[30] Foreign Application Priority Data

Jun. 21, 1993 [EP] European Pat. Off. .............. 93830265

[51] Int. Cl.⁶ ................................... H02M 3/18
[52] U.S. Cl. ................... 363/60; 307/110; 320/1
[58] Field of Search ..................... 363/59, 60, 61; 307/110; 320/1

[56] References Cited

U.S. PATENT DOCUMENTS

| | | | |
|---|---|---|---|
| 4,616,303 | 10/1986 | Mauthe | 363/60 |
| 5,038,266 | 8/1991 | Callen et al. | 363/89 |
| 5,173,627 | 12/1992 | Lien | 307/443 |
| 5,392,205 | 2/1995 | Zavaleta | 363/59 |

FOREIGN PATENT DOCUMENTS

| | | |
|---|---|---|
| 257810 | 2/1988 | European Pat. Off. . |
| 540948 | 12/1993 | European Pat. Off. . |

OTHER PUBLICATIONS

IEEE Journal of Solid–State Circuits, vol. 24, No. 2, Apr. 1989, Callias et al., "A Set of Four IC's in CMOS Technology for a Programmable Hearing Aid".

IEEE Journal of Solid–State Circuits, vol. 24, No. 5, Oct. 1989, Witters et al., "Analysis and Modeling of On–Chip High–Voltage Generator Circuits for Use in EEPROM Circuits".

Primary Examiner—Peter S. Wong
Assistant Examiner—Y. Jessica Han
Attorney, Agent, or Firm—Robert Groover; Betty Formby

[57] ABSTRACT

A voltage multiplier for relatively high output current has its design output voltage stabilized and rendered independent of process spread, temperature, supply voltage and output current level, by a stabilization loop driving the switch that cyclically connects to ground a charge transfer capacitance of the functional voltage multiplier circuit. The feedback loop comprises an integrating stage, stabilized by creating a low-frequency zero in the transfer function for compensating one of two low-frequency poles of the transfer function of the whole circuit.

40 Claims, 4 Drawing Sheets

FIG. 5a  POWER-DOWN CONDITION

FIG. 5b  OPERATIVE CONDITION

FIG. 6

FIG. 8a  POWER-DOWN CONDITION

FIG. 8b  OPERATIVE CONDITION

FIG. 7

VOLTAGE MULTIPLIER FOR HIGH OUTPUT CURRENT WITH STABILIZED OUTPUT VOLTAGE

CROSS-REFERENCE TO RELATED APPLICATION

Figure 6:
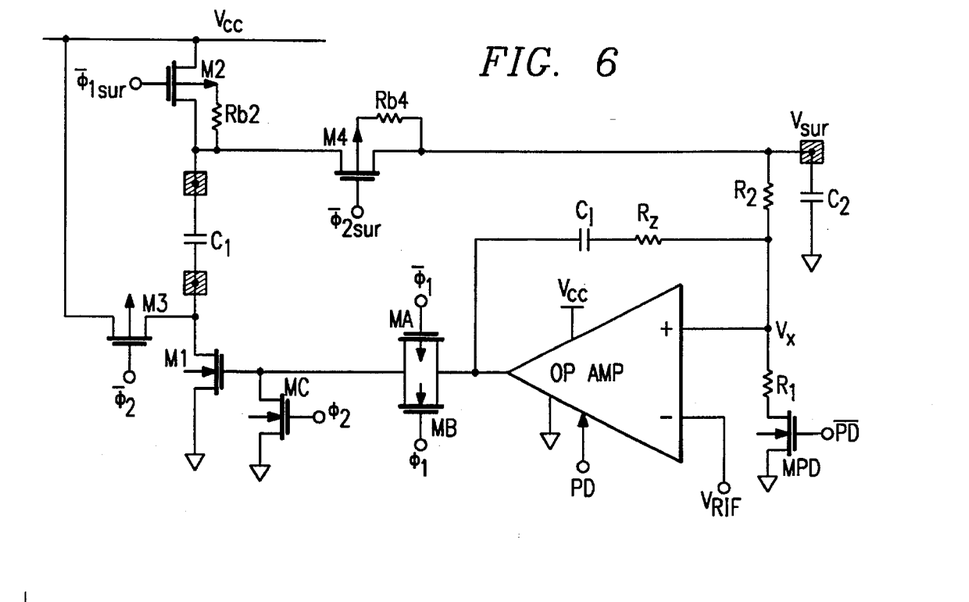
FIG. 6 shows an alternative embodiment which has now been discovered to be advantageous.
Figure 7:
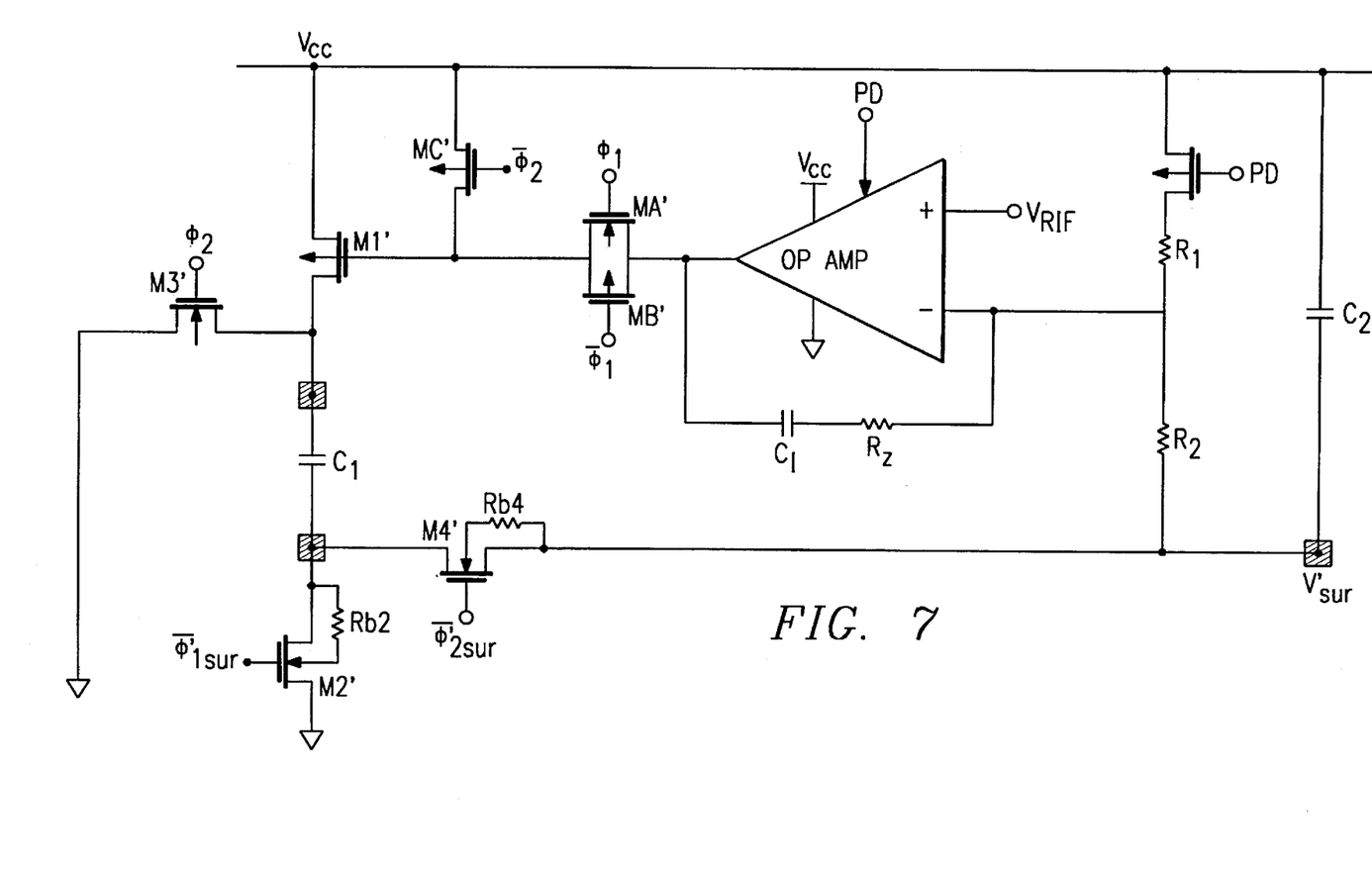
FIG. 7 shows a further alternative embodiment in a P-well CMOS process.
Figure 8A:
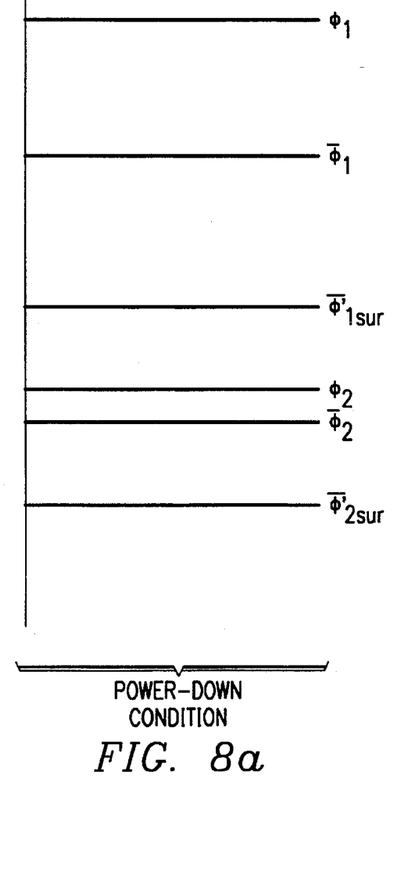
FIG. 8 shows voltage waveforms for the embodiment of FIG. 7, and signal levels during power-down.
Figure 8B:
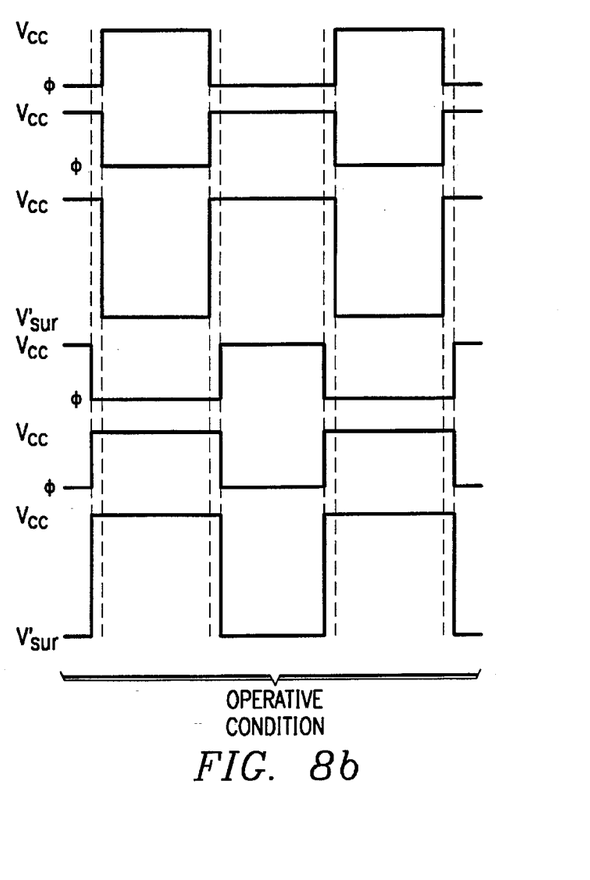

This application claims priority from European app'n 93830265.0, filed Jun. 21, 1993, which is hereby incorporated by reference. FIGS. 6–8 and additional text are also included in the present application.

BACKGROUND AND SUMMARY OF THE INVENTION

The present invention concerns a charge pumping circuit (e.g. voltage multiplier or voltage booster), which is provided with an innovative arrangement for stabilizing its output voltage.

Often in electronic systems there is a need of generating a DC voltage higher than the supply voltage. Such a voltage boosting function is commonly effected with a so-called voltage multiplier or voltage booster. However, the circuit implementations of a voltage booster may be differ considerably depending on the level of the current that the circuit should be able to deliver.

Figure 1A:
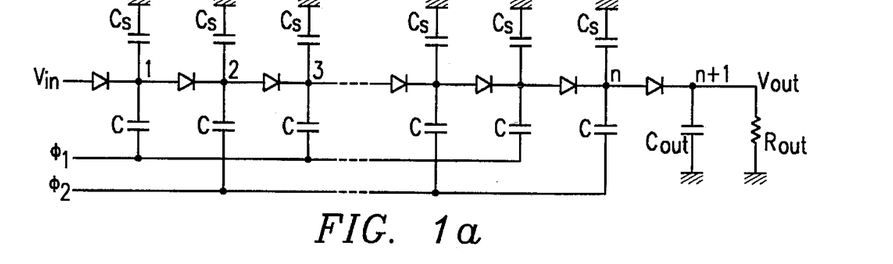
FIG. 1a is a circuit diagram of a voltage multiplier for low output current, made with bipolar junction components, as described above.
Figure 1B:
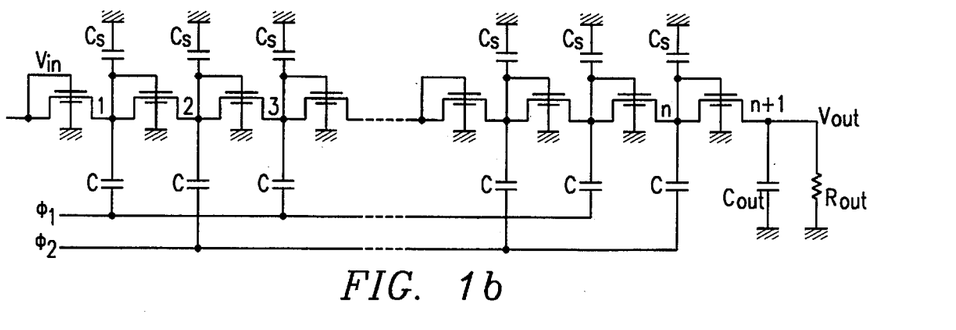
FIG. 1b is a circuit diagram of a voltage multiplier for low output current, made with MOS components, as already described above.

For relatively low output current levels (in the order of 10 μA), as in the case of write operations of EPROM memories, an often used solution is the circuit shown in FIG. 1a (employing bipolar junction transistors BJT) or in FIG. 1b (employing MOS transistors), as described in Witters et al., "Analysis and Modelling of On-Chip High-Voltage Generator Circuits for Use in EEPROM Circuits", 24 IEEE JOURNAL OF SOLID-STATE CIRCUITS 1372 (October 1989), which is hereby incorporated by reference.

Figure 2:
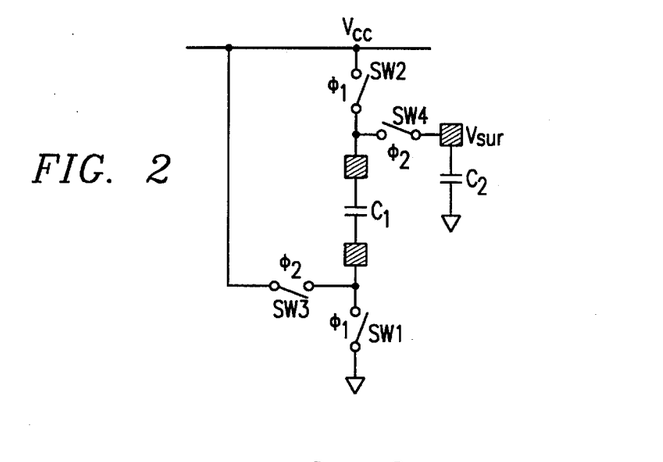
FIG. 2 is a functional diagram of a voltage multiplier suitable to deliver a relatively high output current.

Conversely, when the voltage multiplier must deliver output currents of a remarkable level (in the order of ten mA), as in the case of analog integrated circuits wherein the supply voltage must be doubled or tripled for attaining certain performances, a typical solution requires the employment of at least two large capacitances (normally external to the integration circuit). A first capacitor $C_1$ is used for loading and transfering electric charge, while the second capacitor $C_2$ has the function of storing the periodically transferred charge, as schematically depicted in FIG. 2. The four switches (SW1, SW2, SW3, SW4) are driven by first and second phase control signals ($\phi_1$ and $\phi_2$).

Basically, during a first phase ($\phi_1$) of the control clock, the capacitance $C_1$ is connected between $V_{CC}$ and ground (GND) and therefore a voltage equal to $V_{CC}$ develops on the "upper" terminal as referred to the "lower" terminal of the capacitor that is connected to ground. During a second phase ($\phi_2$) of the control clock, the lower terminal is connected to $V_{CC}$ while the upper terminal is connected to the output node (on $C_2$), onto which a voltage $V_{sur}$ develops.

If the output current is null, then it is easy to see that, after several clock periods, the output voltage $V_{sur}$ would become equal to 2 $V_{CC}$ and perfectly stable. The output capacitance $C_2$ stores the output voltage $V_{sur}$.

When a load connected to the output node ($V_{sur}$) draws current, the resulting value of the output voltage $V_{sur}$ will be determined by the balance between the current drawn by the load and the quantity of charge per unit time delivered through the transfer capacitance $C_1$, while the output capacitance $C_2$ limits the amplitude of the "ripple" of the output voltage $V_{sur}$.

Figure 3:
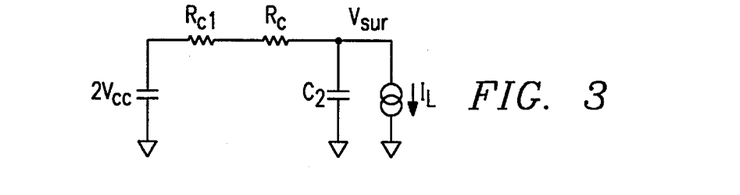
FIG. 3 is an equivalent circuit of the functional diagram of FIG. 2.

In Callias et al., "A Set of Four IC's in CMOS Technology for a Programmable Hearing Aid", 24 IEEE JOURNAL OF SOLID-STATE CIRCUITS 301 (April 1989), which is hereby incorporated by reference, it is explained that the value of the output voltage $V_{sur}$ in case of current absorption by a load, may be easily calculated by analyzing the equivalent circuit shown in FIG. 3.[1] By following such a derivation, the value of the output voltage in the circuit of FIG. 2 may be seen to be given by the following relationship:

[1] By adding more and more stages, it is possible to attain higher multiplication factors, while maintaining a single storing capacitance $C_2$ connected between the output node ($V_{sur}$) and ground (GND). For example, Callias et al. point out that, if it is desired to triple the voltage $V_{CC}$, it is sufficient to employ two capacitances $C_{1a}$ and $C_{1b}$ (in addition to the capacitor $C_2$). During the phase $\phi 1$, capacitances $C_{1a}$ and $C_{1b}$ would both charge to $V_{CC}$, while during the successive phase $\phi 2$, capacitances $C_{1a}$ and $C_{1b}$ would be connected in series (that is with the lower terminal of the first of the two capacitances $C_{1a}$ connected to $V_{CC}$ and the upper terminal of the second capacitor $C_{1b}$ connected to $V_{sur}$) between $V_{CC}$ and the output node.

$$V_{sur} = 2 V_{CC} - (R_{C1} + R_\tau) I_L$$

where $R_{C1}$ and $R_\tau$ are respectively given by the following equations:

$$R_{C1} = \frac{1}{f_s C_1}$$

$$R_\tau = \frac{1}{f_s C_A} \left[ \frac{e^{-t/t_1}}{1 - e^{-t/t_1}} + \frac{e^{-t/t_2}}{1 - e^{-t/t_2}} \right]$$

where $C_A$ is the capacitance of $C_1$ and $C_2$ in series, and $t_1$ and $t_2$ are RC time constants:

$$C_A = \frac{C_1 C_2}{C_1 + C_2}$$

$$t_1 = (r_{ON1} + r_{ON2}) C_1$$

$$t_2 = (r_{ON3} + r_{ON4}) C_A$$

In the equations above, $f_S$ is the switching frequency of the control clock, and the $r_{ON}$ values represent the respective internal resistance of the switches SW1, SW2, SW3 and SW4, that are employed in the circuit. As may be easily observed, the effective value of the output voltage $V_{sur}$ depends strongly not only on the current $I_L$ absorbed by the load and the value of the supply voltage $V_{CC}$, but also on the internal resistances $r_{ON}$ of the transistors that implement the switches SW1, SW2, SW3 and SW4, that drive the circuit.

The on-resistance of a transistor is an intrinsic parameter which is notoriously dependent from the fabrication process, temperature, supply voltage, etc. Many high precision analog circuits cannot tolerate an excessive spread of the actual output voltage ($V_{sur}$) from the design value.

Thus, a main object of the present invention is to provide a simple low-power voltage multiplier or voltage booster, designed for a relatively high output current, the output voltage of which is stable and substantially independent from process spread, temperature, supply voltage and, within certain limits, also from the output current that is actually delivered to a load.

This object and other advantages are achieved by the output voltage stabilizing circuit of the present invention. The circuit of the invention employs an integrating stage, capable of generating a DC error signal, representative of the difference between a reference voltage and the output voltage of the voltage multiplier. The error signal is employed for driving (during a conduction phase of the operating cycle of the multiplier) a transistor that acts as a switch for connecting to ground at least a charge transfer capacitance ($C_1$) of the voltage multiplier. The generated error signal effectively controls the internal resistance $r_{ON}$, so as to keep constant the output voltage $V_{sur}$ of the voltage multiplier.

Such a driving error signal is fed to a control terminal of the transistor (switch) that connects to ground the charge transfer capacitance of at least a stage of the voltage multiplier, under control of a pair of timing signals, which control a transfer gate of the signal and an auxiliary switch for discharging the control node of the transistor (switch) driven by the error signal.

In the preferred CMOS implementation, PMOS transistors are used to connect the upper terminal of the charge transfer capacitor alternately to the positive supply voltage Vcc and the pumped voltage Vsur, and overdriven clock voltages are used to assure reliable turn-off of these transistors.

Some attempts have been made to provide regulation of a pumped voltage. European application EP-A-0540948 of Zavaleta (Motorola) uses a feedback loop to act on the $r_{ON}$ of a MOS transistor for regulating the output of the charge pump at the desired value. However, the presently preferred embodiment of the present application provides advantages over the Motorola circuit in the manner of implementing the feedback loop. As may be observed from FIG. 4 of the Motorola application, the circuit that implements a proportional+integral function is very complex. It uses three amplifiers (120, 130 and 142), three capacitances (137, 135 and 139), and several switches. By contrast, the innovative circuit disclosed in the present application provides a very simple structure composed of a single amplifier, a capacitance and a resistance for implementing the same function.

Moreover, since the Motorola circuit separates the proportional function from the integral function pair, they are obliged to drive two PMOS transistors (150 and 151) in order to vary the $r_{ON}$; but in the present invention the two functions are implemented together, and in the presently preferred embodiment driving a single n-channel MOS suffices.

Last but not least, given that a main objective in battery powered systems is to limit power consumption as much as possible for prolonging the life of the battery, the innovative circuit of the presently preferred embodiment consumes much less current (power) than the Motorola's circuit. The disclosed circuit employs a single amplifier directly powered by the battery, while Motorola utilizes three amplifiers, of which at least two (120 and 142) are powered at high (boosted) voltage, that is they consume at least five times the current that is consumed in the innovative circuit of the presently preferred embodiment for implementing the feedback loop. In this connection, it should also be noted that the Motorola circuit which generates PTUBBIAS, which biases the n-wells of the PMOS 150, 151, 152 and 154 at the highest potential of VBAT and VDD in order to avoid direct biasing, does not satisfy at all the function that is required at power-up. In fact, by supposing that at power-down VDD=0 V and that therefore PTUBBIAS=VBAT, when leaving the power-down condition, the capacitance 80 will have charged to VBAT during φ1 and therefore, during φ2, will tend to strongly pull-up the node 72, thus forward biasing the diode from p+ (node 72) to n-well (common to 150, 151 and 152). This could give rise to a sudden current absorption in the order of 10–60 mA from VBAT, unduly degrading the battery.

The improved circuit embodiments of FIGS. 6 and 7 provide an additional protection against a current surge when power is first applied, by including small resistors in series with the wells of the devices which are interposed between Vcc and the pumped node $R_{sur}$. Preferably these resistors are formed merely by lateral extensions of the n-well diffusion.

According to certain disclosed innovative embodiments, there is provided: A voltage multiplier circuit, comprising: at least a first charge transfer capacitance and a second output storing capacitance, a first switch, comprising a single transistor, for connecting to ground a first terminal of the first capacitance; the first terminal of the first capacitance being connected to ground only through the first switch; a second switch for connecting a second terminal of the first capacitance to a supply node; a third switch for connecting the first terminal of the first capacitance to the supply node; a fourth switch for connecting the second terminal of the first capacitance to a first terminal of the second capacitance which provides an output node of the voltage multiplier; the second switch being controlled by a first clock phase and the third and fourth switches being controlled by a second clock phase; and further comprising a voltage divider functionally connected between the output node and a ground node of the circuit; a differential amplifier having a noninverting input to which a reference voltage is fed, an inverting input connected to an intermediate node of the voltage divider and to the output of the amplifier through a series comprising an integrating capacitance and a resistance; a first transfer gate, controlled by a first timing signal and by a complementary signal, coincident with the first clock phase, an input of the transfer gate being connected to the output of the amplifier and an output of the transfer gate being connected to a control terminal of the first switch; a fifth switch, controlled by a second timing signal coincident with the second clock phase being functionally connected between the control terminal of the first switch and ground.

According to certain disclosed embodiments, there is also provided: a circuit for stabilizing the output voltage of a voltage multiplier which comprises an integrating stage capable of outputting a DC error signal representative of a difference between a reference voltage and the output voltage; switching means, controlled by a first and second timing signal, for modulating, in accordance with the error signal, the on-resistance of a transistor which functionally connects a charge transfer capacitor of the voltage multiplier to a ground node, during a conduction phase; the charge transfer capacitor being connected to ground, during the conduction phase, only through the transistor.

According to certain disclosed innovative embodiments, there is provided: A voltage multiplier circuit, for obtaining from first and second supply voltages, on an output storing capacitor, a pumped voltage which is not intermediate between the first and second supply voltages, comprising: at least one charge transfer capacitor; a first switch, connected between the second supply voltage and a first terminal of the charge transfer capacitor; a second switch connected between a second terminal of the charge transfer capacitor and the first supply voltage, and connected to be turned on by an active phase of a first clock; a third switch connected between the first terminal of the charge transfer capacitor and the first supply voltage, and connected to be turned on by an active phase of a second clock; a fourth switch connected between the output capacitor and a second terminal of the charge transfer capacitor, and connected to be turned on by an active phase of the second clock; feedback circuitry operatively connected to provide an output which varies in accordance with the deviation of the pumped voltage from a desired target voltage; a transfer gate, connected between the output of the amplifier and a control terminal of the first switch, and connected to be turned on by an active phase of the first clock; a fifth switch, connected between a control terminal of the first switch and the second power supply, and connected to be turned on by an active phase of the second clock; and one or more resistors interconnected with the second and fourth switches to limit transient current between the first power supply voltage and the output capacitor, when power is first applied to the first power supply voltage.

According to certain disclosed innovative embodiments, there is provided: a voltage multiplier circuit, for obtaining from first and second supply voltages, on an output storing capacitor, a pumped voltage which is not intermediate between the first and second supply voltages, comprising: at least one charge transfer capacitor; a first switch, connected between the second supply voltage and a first terminal of the charge transfer capacitor; a second switch connected between a second terminal of the charge transfer capacitor and the first supply voltage, and connected to be turned on by an active phase of a first clock; a third switch connected between the first terminal of the charge transfer capacitor and the first supply voltage, and connected to be turned on by an active phase of a second clock; a fourth switch connected between the output capacitor and a second terminal of the charge transfer capacitor, and connected to be turned on by an active phase of the second clock; a voltage divider operatively connected between the output node and the second supply voltage to provide a divided-down voltage only when enabled by a power-active signal; a differential amplifier having a noninverting input to which a reference voltage is fed, an inverting input connected to receive the divided-down voltage and to the output of the amplifier through a series comprising an integrating capacitance and a resistance; a fifth switch, connected between a control terminal of the first switch and the second power supply, and connected to be turned on by an active phase of the second clock; and one or more resistors interconnected with the second and fourth switches to limit transient current between the first power supply voltage and the output capacitor, when power is first applied to the first power supply voltage.

According to certain disclosed innovative embodiments, there is provided: A voltage multiplier circuit, for obtaining from first and second supply voltages, on an output storing capacitor, a pumped voltage which is not intermediate between the first and second supply voltages, comprising: at least one charge transfer capacitor; a first field-effect transistor, of a first source/drain conductivity type, having a first source/drain region connected to the second supply voltage and a second source/drain region connected to a first terminal of the charge transfer capacitor; a second field-effect transistor, of a second source/drain conductivity type, connected to be turned on by an active phase of a first clock, and having a first source/drain region connected to the first supply voltage, and a second source/drain region connected to a second terminal of the charge transfer capacitor; a third field-effect transistor, of a second source/drain conductivity type, connected to be turned on by an active phase of a second clock, and having a first source/drain region connected to the first supply voltage, and a second source/drain region connected to the first terminal of the charge transfer capacitor; a fourth field-effect transistor, of a second source/drain conductivity type, connected to be turned on by an active phase of the second clock, and having a first source/drain region connected to a second terminal of the charge transfer capacitor, and a second source/drain region connected to the output capacitor; feedback circuitry operatively connected to provide an output which varies in accordance with the deviation of the pumped voltage from a desired target voltage; a transfer gate, connected between the output of the amplifier and a control terminal of the first switch, and connected to be turned on by an active phase of the first clock; an additional switch, connected between the gate of the first transistor and the second power supply, and connected to be turned on by an active phase of the second clock; the second and fourth transistors each having a resistive connection between the respective second source/drain region thereof and a respective body region thereof.

According to certain disclosed innovative embodiments, there is provided: a charge pump circuit, for obtaining, from positive and zero supply voltages, a negative voltage on an output storing capacitor, comprising: at least one charge transfer capacitor; a first field-effect transistor, having a first P-type source/drain region connected to the positive supply voltage and a second P-type source/drain region connected to a first terminal of the charge transfer capacitor; a second field-effect transistor, connected to be turned on by an active phase of a first clock, and having a first N-type source/drain region connected to the first supply voltage, and a second source/drain region connected to a second terminal of the charge transfer capacitor; a third field-effect transistor, of a second source/drain conductivity type, connected to be turned on by an active phase of a second clock, and having a first source/drain region connected to the first supply voltage, and a second source/drain region connected to the first terminal of the charge transfer capacitor; a fourth field-effect transistor, of a second source/drain conductivity type, connected to be turned on by an active phase of the second clock, and having a first source/drain region connected to a second terminal of the charge transfer capacitor, and a second source/drain region connected to the output capacitor; feedback circuitry operatively connected to provide an output which varies in accordance with the deviation of the pumped voltage from a desired target voltage; a transfer gate, connected between the output of the amplifier and a control terminal of the first switch, and connected to be turned on by an active phase of the first clock; an additional switch, connected between the gate of the first transistor and the second power supply, and connected to be turned on by an active phase of the second clock; the second and fourth transistors each having a resistive connection between the respective second source/drain region thereof and a respective body region thereof.

According to certain disclosed innovative embodiments, there is provided: an integrated circuit method for generating from first and second supply voltages, using at least one charge transfer capacitor, a pumped voltage, on an output storing capacitor, which is not intermediate between the first and second supply voltages, comprising the steps of: on a first clock phase, connecting a first terminal of the charge transfer capacitor to the first supply voltage, and connecting a second terminal of the charge transfer capacitor to the second supply voltage, using at least one variable impedance element which is regulated in accordance with variations of the pumped voltage from a target voltage; on a second clock phase which does not overlap with the first clock phase, connecting the second terminal of the charge transfer capacitor to the first supply voltage, and connecting the first terminal of the charge transfer capacitor to provide the pumped voltage on the output storing capacitor; the steps (a.) and (b.) being repeatedly alternated; and when power is first applied, routing at least some of the transient current between the first power supply and the output storing capacitor through one or more series resistors.

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the circuit of the invention will be more easily understood through the following description of an important embodiment and by referring to the annexed drawings, wherein.

DETAILED DESCRIPTION OF THE PREFERRED EMBODIMENTS

The numerous innovative teachings of the present application will be described with particular reference to the presently preferred embodiment (by way of example, and not of limitation), in which:

By referring to the circuit diagram of FIG. 4, the feedback loop for stabilizing the output voltage of the circuit according to the presently preferred embodiment of the present invention, may be structured as follows.

A voltage divider, which in the example shown, is represented by the two resistances R1 and R2 connected in series between the output node $V_{sur}$ of the voltage multiplier circuit and a common ground node of the circuit, provides on an intermediate node thereof, an attenuated replica of the output voltage $V_{sur}$ of the voltage multiplier. This replica signal is fed to an inverting input of an operational amplifier OP-AMP, which, being powered at $V_{CC}$, could not otherwise tolerate an input voltage higher than $V_{CC}$.

An integrating stage is constituted by the operational amplifier OP-AMP, provided with a feedback loop that essentially comprises an integrating capacitance $C_f$. The integrating stage practically compares the replica signal $V_X$, provided by the voltage divider R1–R2, with a reference voltage $V_{RIF}$ and outputs a DC error signal.

A switch or "transfer gate", which, as in the example shown, may be composed of a MOS transistor pair MA–MB (where MA is PMOS and MB NMOS), is controlled by a first clock phase $\phi_1$ and by its inverted replica $\phi_1\backslash$. The transfer gate MA–MB, during a first phase $\phi_1$ of the control clock, transfers the error signal generated by the integrating stage to the control gate of the NMOS transistor M1, which constitutes the switch SW1 of the functional circuit of the voltage multiplier (FIG. 2).

A third MOS transistor MC is activated by the clock's phase $\phi_2$ and during this phase of the clock's cycle, connects to ground the gate of M1, thus ensuring its cut-off.

By virtue of the high DC gain of the stabilizing feedback loop, the feedback forces the condition:

$$V_X = V_{RIF}$$

and therefore:

$$V_{sur} = V_{RIF} \frac{R_1 + R_2}{R_1}$$

It should be immediately noted from the above equation that the output voltage $V_{sur}$ is independent from process spreads, temperature, $V_{CC}$ and output current delivered to a load.

A resistance $R_Z$, connected in series with the integrating capacitance $C_f$ of the feedback line of the operational amplifier OP-AMP, has an important function for ensuring a great stability of the circuit. In fact, the circuit presents two low-frequency "poles" (the DC pole of the integrating stage and a second low-frequency pole intrinsic to the equivalent circuit of the voltage multiplier circuit, as depicted in FIG. 3) that would tend to restrict the stability margin. The introduction of a resistance $R_Z$, in series with $C_f$ in the feedback line, determines the creation of a low-frequency "zero" that compensates a low-frequency "pole", thus enhancing stability.

The positive effects of the resistance $R_Z$ may be observed also during the power-on transient of the circuit, during which the system operates in a nonlinear manner. The presence of a series resistance $R_Z$ reduces the "settling" time (the time that the circuit employs from the power-on instant to reach a steady state condition, that is for developing the design voltage $V_{sur}$ on its output node) by a factor that may be comprised between 10 and 1000, depending upon operating conditions and structural parameters of the circuit (process, temperature, output current, $V_{CC}$).

Figure 4:
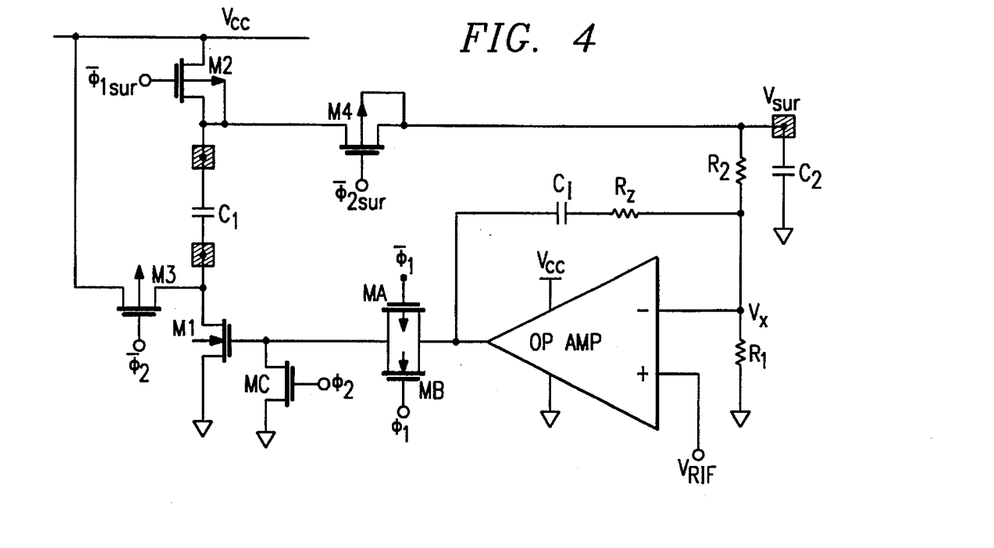
FIG. 4 is a functional diagram of a voltage multiplier provided with means for stabilizing the output voltage, according to the present invention.
Figure 5A:
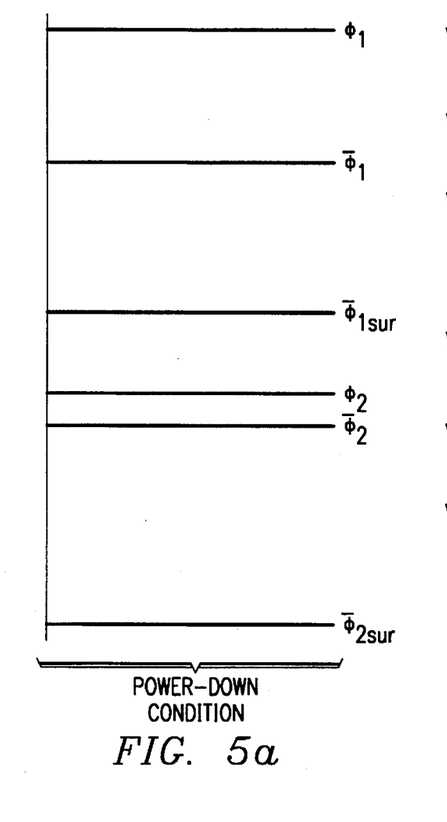
FIG. 5 is a timing diagram of the various signals of the circuit of the invention.
Figure 5B:
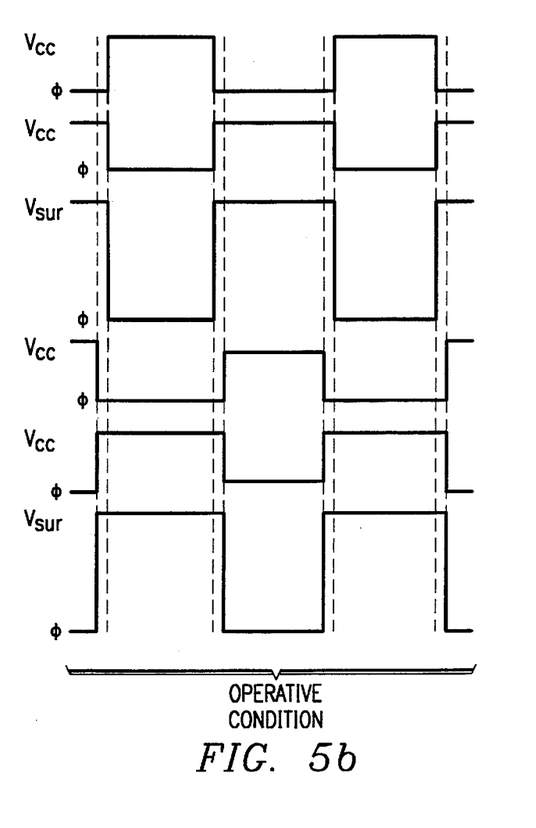

A timing diagram showing the waveform of the control signals employed in the circuit of FIG. 4, according to an embodiment of the invention, are shown in FIG. 5.

As may be seen, the phase $\phi_1$ ($\phi_1$ and $\phi_1\backslash$) is generally coincident with the phase $\phi_{1sur}$, while the phase $\phi_2$ ($\phi_2$, $\phi_2\backslash$) is generally coincident with the phase $\phi_{2sur}$. However, note that this is NOT true of $\phi_{2sur}\backslash$ in the power-down condition: in the power-down condition both $\phi_{1sur}\backslash$ and $\phi_{2sur}\backslash$ are low, and therefore both M2 and M4 will turn on as Vcc rises.

The phases $\phi_{1sur}\backslash$ and $\phi_{2sur}\backslash$ may be generated, e.g., by a timing circuit powered at the output voltage $V_{sur}$ of the voltage multiplier. In other words, the driving phases $\phi_{1sur}\backslash$ and $\phi_{2sur}\backslash$ are voltage-boosted phases. The other switches M3 (PMOS), MC, MA and MB may be controlled by control phases that are generated by a timing circuit similar to the one employed for generating the boosted phases $\phi_{1sur}\backslash$ and $\phi_{2sur}\backslash$, but powered at the supply voltage $V_{CC}$. This is not strictly essential for the operation of the circuit, and, in practice, also the switches M3, MC, MA and MB may be controlled by employing the same voltage boosted phases $\phi_{1sur}\backslash$–$\phi_{1sur}$ and $\phi_{2sur}\backslash$–$\phi_{2sur}$, as will be evident to a person skilled in the art.

In the sample implementation of FIG. 4, note that transistors M2, M3, and M4 are all PMOS. This helps to avoid incurring $V_T$ drops from the supply voltage $V_{CC}$. However, of course, one of ordinary skill in the art can implement the disclosed invention in various other circuit arrangements, and in technologies other than CMOS.

FIG. 6 shows an alternative embodiment which has been discovered to be advantageous. The circuit of FIG. 4, wherein the n-well of two PMOS devices (M1 and M4) have been joined to the respective sources, may still exhibit a current spike at power-up. FIG. 6 shows a further improvement of this circuit, including an expedient for reducing drastically the current spike at power-up.

In a power-down condition M1, M2, M4 are ON and M3 is OFF, as shown at the left side of FIG. 5. (The clocks are conditioned on the power-down signal PD, which is used to reduce to zero the current consumption of the IC and of the voltage multiplier when the IC itself is not used). Moreover, during power-down, the added MOS MPD (gated by complemented power-down signal PD\) is OFF (and therefore prevents current consumption by the voltage divider R1+R2), while the amplifier turns off, forcing its output to Vcc voltage (thus confirming ON the transistor M1). In this embodiment, two resistors Rb2 and Rb4 have been inserted in series with the n-wells of M2 and M4, respectively, in order to limit the current spikes at power-up. From simulation, it has been found that a resistance of a few K$\Omega$, which may be realized with the n-well cell itself, will be sufficient to reduce the injection of current by a factor of 100, that is to a few tenths of a milliAmp, which should be readily tolerated by the battery.

Note that the resistors Rb2 and Rb4 do not pass any significant current during normal operation: the importance of these resistors is primarily at start-up.

FIG. 7 shows a further alternative embodiment in which charge pumping is used to achieve a negative voltage $R_{sur}'$ from a positive supply, in a P-well CMOS process. In this embodiment the polarities and connections of many of the transistors have been reversed, and accordingly the reference numerals have been primed. Thus PMOS M1' in FIG. 7 is analogous to NMOS M1 in FIG. 6, NMOS M2' in FIG. 7 is analogous to PMOS M2 in FIG. 6, NMOS M3' in FIG. 7 is analogous to PMOS M3 in FIG. 6, NMOS M4' in FIG. 7 is analogous to PMOS M4 in FIG. 6, and PMOS MC' in FIG. 7 is analogous to NMOS MC in FIG. 6, PMOS MB' of FIG. 7 is analogous to NMOS MB of FIG. 6 and NMOS MA' of FIG. 7 is analogous to PMOS MA of FIG. 6. A similar polarity-reversal is applied to the clock signals: note that $\phi_1$ in FIG. 6 is replaced by its complement $\phi_1\backslash$ in FIG. 7, and $\phi_2$ is replaced by its complement $\phi_2\backslash$. Moreover, the overdriven positive clocks $\phi_{1sur}$ and $\phi_{2sur}$ are replaced by negatively overdriven (sub-ground) clocks $\phi_{1sur}'$ and $\phi_{2sur}'$. As in FIG. 6, the resistors Rb2 and Rb4 limit the current surge caused by shifting the potential of the wells when power is first applied.

The timing diagram of FIG. 8 shows the clock voltage levels in the circuit of FIG. 7, in power-down and in operating conditions. Note that in the power-down condition transistors M2' and M4' are both ON.

Of course, these alternatives are merely a few of the many possible modifications and variations which may be made to the disclosed innovative ideas.

What is claimed is:

1. A voltage multiplier circuit, comprising:
   at least a first charge transfer capacitance and a second output storing capacitance,
   a first switch, comprising a single transistor, for connecting to ground a first terminal of said first capacitance; said first terminal of said first capacitance being connected to ground only through said first switch;
   a second switch for connecting a second terminal of said first capacitance to a supply node;
   a third switch for connecting said first terminal of said first capacitance to said supply node;
   a fourth switch for connecting the second terminal of said first capacitance to a first terminal of said second capacitance which provides an output node of the voltage multiplier;
   said second switch being controlled by a first clock phase and said third and fourth switches being controlled by a second clock phase;
   and further comprising a voltage divider functionally connected between said output node and a ground node of the circuit;
   a differential amplifier having a noninverting input to which a reference voltage is fed, an inverting input connected to an intermediate node of said voltage divider and to the output of the amplifier through a series comprising an integrating capacitance and a resistance;
   a first transfer gate, controlled by a first timing signal and by a complementary signal, coincident with said first clock phase, an input of said transfer gate being connected to said output of the amplifier and an output of said transfer gate being connected to a control terminal of said first switch;
   a fifth switch, controlled by a second timing signal coincident with said second clock phase being functionally connected between said control terminal of said first switch and ground.

2. The circuit of claim 1, further comprising one or more resistors interconnected with said second and fourth switches to limit transient current between said first power supply voltage and said output capacitor, when power is first applied to said first power supply voltage.

3. The circuit of claim 1, wherein said first switch consists of an N-channel insulated-gate field-effect transistor.

4. The circuit of claim 1, wherein said second, third, and fourth switches each consist of a P-channel insulated-gate field-effect transistor.

5. The circuit of claim 1, wherein said second and fourth switches each consist of a P-channel insulated-gate field-effect transistor, and are connected to be driven by a clock voltage which is at least approximately equal to said pumped voltage.

6. The circuit of claim 1, wherein said transfer gate consists of a P-channel insulated-gate field-effect transistor connected in parallel with an N-channel insulated-gate field-effect transistor.

7. A voltage multiplier circuit, for obtaining, from first and second supply voltages, a pumped voltage which is not intermediate between said first and second supply voltages, comprising:
   at least one charge transfer capacitor;
   a first switch, connected between said second supply voltage and a first terminal of said charge transfer capacitor;
   a second switch connected between a second terminal of said charge transfer capacitor and said first supply voltage, and connected to be turned on by an active phase of a first clock;
   a third switch connected between said first terminal of said charge transfer capacitor and said first supply voltage, and connected to be turned on by an active phase of a second clock;
   a fourth switch connected between said output capacitor and a second terminal of said charge transfer capacitor, and connected to be turned on by an active phase of said second clock;
   feedback circuitry operatively connected to provide an output which varies in accordance with the deviation of said pumped voltage from a desired target voltage;

a transfer gate, connected between said output of the amplifier and a control terminal of said first switch, and connected to be turned on by an active phase of said first clock;

a fifth switch, connected between a control terminal of said first switch and said second power supply, and connected to be turned on by an active phase of said second clock; and one or more resistors interconnected with said second and fourth switches to limit transient current when power is first applied to said first and second power supply voltages.

8. The circuit of claim 7, further comprising an output storing capacitor connected to store and stabilize said pumped voltage.

9. The circuit of claim 7, further comprising one or more resistors interconnected with said second and fourth switches to limit transient current between said first power supply voltage and said output capacitor, when power is first applied to said first power supply voltage.

10. The circuit of claim 7, wherein said first switch consists of an N-channel insulated-gate field-effect transistor.

11. The circuit of claim 7, wherein said second, third, and fourth switches each consist of a P-channel insulated-gate field-effect transistor.

12. The circuit of claim 7, wherein said second and fourth switches each consist of a P-channel insulated-gate field-effect transistor, and are connected to be driven by a clock voltage which is at least approximately equal to said pumped voltage.

13. The circuit of claim 7, wherein said feedback circuitry comprises a differential amplifier having an output which is fed through a transfer gate which is connected to be turned on on an active phase of said first clock.

14. A voltage multiplier circuit, for obtaining from first and second supply voltages, on an output storing capacitor, a pumped voltage which is not intermediate between said first and second supply voltages, comprising:

at least one charge transfer capacitor;

a first switch, connected between said second supply voltage and a first terminal of said charge transfer capacitor;

a second switch connected between a second terminal of said charge transfer capacitor and said first supply voltage, and connected to be turned on by an active phase of a first clock;

a third switch connected between said first terminal of said charge transfer capacitor and said first supply voltage, and connected to be turned on by an active phase of a second clock;

a fourth switch connected between said output capacitor and a second terminal of said charge transfer capacitor, and connected to be turned on by an active phase of said second clock;

a voltage divider operatively connected between said output node and said second supply voltage to provide a divided-down voltage only when enabled by a power-active signal;

a differential amplifier having a noninverting input to which a reference voltage is fed, an inverting input connected to receive said divided-down voltage and to the output of the amplifier through a series comprising an integrating capacitance and a resistance;

a fifth switch, connected between a control terminal of said first switch and said second power supply, and connected to be turned on by an active phase of said second clock; and one or more resistors interconnected with said second and fourth switches to limit transient current between said first power supply voltage and said output capacitor, when power is first applied to said first power supply voltage.

15. The circuit of claim 14, wherein said first switch consists of an N-channel insulated-gate field-effect transistor.

16. The circuit of claim 14, wherein said second, third, and fourth switches each consist of a P-channel insulated-gate field-effect transistor.

17. The circuit of claim 14, wherein said second and fourth switches each consist of a P-channel insulated-gate field-effect transistor, and are connected to be driven by a clock voltage which is at least approximately equal to said pumped voltage.

18. The circuit of claim 14, wherein said differential amplifier has an output which is fed through a transfer gate which is connected to be turned on on an active phase of said first clock.

19. A voltage multiplier circuit, for obtaining from first and second supply voltages, on an output storing capacitor, a pumped voltage which is not intermediate between said first and second supply voltages, comprising:

at least one charge transfer capacitor;

a first field-effect transistor, of a first source/drain conductivity type, having a first source/drain region connected to said second supply voltage and a second source/drain region connected to a first terminal of said charge transfer capacitor;

a second field-effect transistor, of a second source/drain conductivity type, connected to be turned on by an active phase of a first clock, and having a first source/drain region connected to said first supply voltage, and a second source/drain region connected to a second terminal of said charge transfer capacitor;

a third field-effect transistor, of a second source/drain conductivity type, connected to be turned on by an active phase of a second clock, and having a first source/drain region connected to said first supply voltage, and a second source/drain region connected to said first terminal of said charge transfer capacitor;

a fourth field-effect transistor, of a second source/drain conductivity type, connected to be turned on by an active phase of said second clock, and having a first source/drain region connected to a second terminal of said charge transfer capacitor, and a second source/drain region connected to said output capacitor;

feedback circuitry operatively connected to provide an output which varies in accordance with the deviation of said pumped voltage from a desired target voltage;

a transfer gate, connected between said output of the amplifier and a control terminal of said first switch, and connected to be turned on by an active phase of said first clock;

an additional switch, connected between the gate of said first transistor and said second power supply, and connected to be turned on by an active phase of said second clock;

said second and fourth transistors each having a resistive connection between said respective second source/drain region thereof and a respective body region thereof.

20. The circuit of claim 19, further comprising one or more resistors interconnected with said second and fourth switches to limit transient current between said first power supply voltage and said output capacitor, when power is first applied to said first power supply voltage.

21. The circuit of claim 19, wherein said first switch consists of an N-channel insulated-gate field-effect transistor.

22. The circuit of claim 19, wherein said second, third, and fourth switches each consist of a P-channel insulated-gate field-effect transistor.

23. The circuit of claim 19, wherein said second and fourth switches each consist of a P-channel insulated-gate field-effect transistor, and are connected to be driven by a clock voltage which is at least approximately equal to said pumped voltage.

24. The circuit of claim 19, wherein said feedback circuitry comprises a differential amplifier having an output which is fed through a transfer gate which is connected to be turned on on an active phase of said first clock.

25. A charge pump circuit, for obtaining, from positive and zero supply voltages, a negative voltage on an output storing capacitor, comprising:

at least one charge transfer capacitor;

a first field-effect transistor, having a first P-type source/drain region connected to said positive supply voltage and a second P-type source/drain region connected to a first terminal of said charge transfer capacitor;

a second field-effect transistor, connected to be turned on by an active phase of a first clock, and having a first N-type source/drain region connected to said first supply voltage, and a second source/drain region connected to a second terminal of said charge transfer capacitor;

a third field-effect transistor, of a second source/drain conductivity type, connected to be turned on by an active phase of a second clock, and having a first source/drain region connected to said first supply voltage, and a second source/drain region connected to said first terminal of said charge transfer capacitor;

a fourth field-effect transistor, of a second source/drain conductivity type, connected to be turned on by an active phase of said second clock, and having a first source/drain region connected to a second terminal of said charge transfer capacitor, and a second source/drain region connected to said output capacitor;

feedback circuitry operatively connected to provide an output which varies in accordance with the deviation of said pumped voltage from a desired target voltage;

a transfer gate, connected between said output of the amplifier and a control terminal of said first switch, and connected to be turned on by an active phase of said first clock;

an additional switch, connected between the gate of said first transistor and said second power supply, and connected to be turned on by an active phase of said second clock;

said second and fourth transistors each having a resistive connection between said respective second source/drain region thereof and a respective body region thereof.

26. The circuit of claim 25, further comprising one or more resistors interconnected with said second and fourth switches to limit transient current between said first power supply voltage and said output capacitor, when power is first applied to said first power supply voltage.

27. The circuit of claim 25, wherein said first switch consists of a P-channel insulated-gate field-effect transistor.

28. The circuit of claim 25, wherein said second, third, and fourth switches each consist of an N-channel insulated-gate field-effect transistor.

29. The circuit of claim 25, wherein said second and fourth switches each consist of an N-channel insulated-gate field-effect transistor, and are connected to be driven by a clock voltage which is approximately equal to said pumped voltage.

30. A circuit for stabilizing the output voltage of a voltage multiplier which comprises an integrating stage capable of outputting a DC error signal representative of a difference between a reference voltage and said output voltage;

switching means, controlled by a first and second timing signal, for modulating, in accordance with said error signal, the on-resistance of a transistor which functionally connects a charge transfer capacitor of said voltage multiplier to a ground node, during a conduction phase; said charge transfer capacitor being connected to ground, during said conduction phase, only through said transistor.

31. A stabilization circuit according to claim 30, wherein said switching means further comprises a first switch, functionally connected between an output of said integrating stage and a control terminal of said ground-connection transistor and controlled by said first timing signal and a second switch, functionally connected between said control terminal and ground and controlled by said second timing signal.

32. A stabilization circuit according to claim 31, wherein said first switch is composed of a pair of complementary transistors, functionally connected in parallel, and driven by said first timing signal and by a complementary signal thereof.

33. A stabilization circuit according to claim 32, wherein said first timing signal and the respective complementary signal are coincident with a first clock phase that drives a switch for connecting to a power supply node said charge transfer capacitor of the voltage multiplier.

34. A stabilization circuit according to claim 33, wherein said clock phases are voltage-boosted signals, while said first and second timing signals are not boosted.

35. A stabilization circuit according to claim 31, wherein said second timing signal is coincident with a second clock phase that drives a transfer switch of charge stored in said transfer capacitor to an output capacitor of the voltage multiplier.

36. A stabilization circuit according to claim 34, wherein said clock phases are voltage-boosted signals, while said first and second timing signals are not boosted.

37. A stabilization circuit according to claim 34, wherein said integrating stage is composed of an operational amplifier provided with a negative feedback line that comprises an integrating capacitance and a series resistance;

the value of said series resistance being such as to implement a low-frequency zero in the transfer function of the circuit.

38. The circuit of claim 30, further comprising one or more resistors interconnected with said second and fourth switches to limit transient current between said first power supply voltage and said output capacitor, when power is first applied to said first power supply voltage.

39. An integrated circuit method for generating from first and second supply voltages, using at least one charge transfer capacitor, a pumped voltage, on an output storing capacitor, which is not intermediate between said first and second supply voltages, comprising the steps of:

(a.) on a first clock phase, connecting a first terminal of said charge transfer capacitor to said first supply voltage, and connecting a second terminal of said charge transfer capacitor to said second supply voltage, using at least one variable impedance element which is regulated in accordance with variations of said pumped voltage from a target voltage;

(b.) on a second clock phase which does not overlap with said first clock phase, connecting said second terminal of said charge transfer capacitor to said first supply voltage, and connecting said first terminal of said charge transfer capacitor to provide said pumped voltage on said output storing capacitor;

said steps (a.) and (b.) being repeatedly alternated; and (c.) when power is first applied, routing at least some of the transient current between said first power supply and said output storing capacitor through one or more series resistors.

40. The method of claim 39, comprising the additional step of dividing down said pumped voltage, using a voltage divider which is connected to be disabled during a power-down condition, to provide a scaled voltage, and comparing the scaled voltage against a reference voltage, and controlling said variable impedance element in accordingly.

* * * * *